US005750602A

United States Patent [19]
Köhler et al.

[11] Patent Number: 5,750,602
[45] Date of Patent: *May 12, 1998

[54] FLAMEPROOFED POLYCARBONATE/ABS BLENDS RESISTANT TO STRESS CRACKING

[75] Inventors: Burkhard Köhler; Jürgen Kirsch; Richard Weider; Dieter Wittmann, all of Leverkusen; Horst Beicher, Tönisvorst, all of Germany

[73] Assignee: Bayer AG, Leverkusen, Germany

[*] Notice: The portion of the term of this patent subsequent to Jun. 14, 2016, has been disclaimed.

[21] Appl. No.: 731,082

[22] Filed: Oct. 9, 1996

[30] Foreign Application Priority Data

Oct. 19, 1995 [DE] Germany .......................... 195 38 892.5

[51] Int. Cl.$^6$ .......................... C08K 5/523; C08L 69/00; C08L 55/02
[52] U.S. Cl. .......................... 524/127; 524/123; 524/125; 524/139; 524/140; 524/141
[58] Field of Search .......................... 524/123, 125, 524/127, 139, 140, 141

[56] References Cited

U.S. PATENT DOCUMENTS

| 4,798,873 | 1/1989 | Meurer et al. | 525/333.7 |
| 5,061,745 | 10/1991 | Wittmann | 524/140 |
| 5,204,394 | 4/1993 | Gosens | 524/127 |

FOREIGN PATENT DOCUMENTS

| 0 305 718 | 3/1989 | European Pat. Off. . |
| 1 170 141 | 5/1964 | Germany . |

*Primary Examiner*—David Buttner
*Attorney, Agent, or Firm*—Connolly & Hutz

[57] ABSTRACT

The invention relates to flameproofed polycarbonate/ABS blends which are resistant to stress cracking, wherein the polycarbonates are wholly or partly modified by halobutyl rubber blocks.

12 Claims, No Drawings

FLAMEPROOFED POLYCARBONATE/ABS BLENDS RESISTANT TO STRESS CRACKING

The invention relates to flameproofed polycarbonate/ABS blends which are resistant to stress cracking, wherein the polycarbonates are wholly or partly modified by halobutyl rubber blocks.

Mixtures of polycarbonate and graft polymers are known generally (for example, DE 1 170 141). The flameproofness and resistance to stress cracking of these mixtures are inadequate for many applications.

Polycarbonates modified by polyisobutylene are also known (for example, EP-A 305 718, DE-OS 3 618 378 (equivalent to U.S. Pat. No. 4,798,873)).

The object of the present invention is the provision of moulding compositions based on polycarbonate and graft polymers and having a high flameproofness and resistance to stress cracking.

It has now been found that mixtures of polycarbonates modified by halobutyl rubbers, optionally unmodified polycarbonates, graft polymers, optionally other thermoplastic polymers, flameproofing additives such as, for example, phosphate esters and/or Teflon, have a surprisingly high resistance to stress cracking while remaining completely flameproof.

The present invention provides thermoplastic moulding compositions, containing

- A) from 5 to 90, preferably from 30 to 85, parts by weight of block copolycarbonates of polycarbonate blocks and from 0.5 to 30 wt. %, preferably from 1 to 25 wt. %, in particular from 4 to 20 wt. % (referred to the block copolycarbonate) of polyisobutylene alpha-haloketocarboxylic acid blocks (PIB blocks), wherein the polyisobutylene alpha-haloketocarboxylic acid blocks have average molecular weights $\overline{M}_n$ (number average) of between 500 and 50,000, halogen contents (chlorine or bromine) prior to incorporation of between 0.1 and 15 wt. %, preferably 0.5 and 5 wt. %, (referred to the PIB block) and acid numbers of between 2 and 250 mg KOH/g,
- B) from 5 to 95, preferably from 8 to 90, in particular from 8 to 35, parts by weight of graft polymer of a mixture of
  - B1.1 from 50 to 95, preferably from 60 to 90, parts by weight of styrene, α-methylstyrene, styrene ring-substituted by halogen or methyl, $C_1$–$C_8$ alkyl methacrylate, in particular methyl methacrylate, $C_1$–$C_8$ alkyl acrylate, in particular methyl acrylate, or mixtures of these compounds and
  - B.1.2 from 5 to 50, preferably from 10 to 40, parts by weight of acrylonitrile, methacrylonitrile, $C_1$–$C_8$ alkyl methacrylates, in particular methyl methacrylate, $C_1$–$C_8$ alkyl acrylate, in particular methyl acrylate, maleic anhydride, $C_1$–$C_4$ alkyl- or phenyl-N-substituted maleimide or mixtures of these compounds on
  - B.2 from 5 to 95, preferably from 20 to 70, parts by weight of polymer based on diene and/or alkyl acrylate, having a glass transition temperature of below −10° C.,
- C) from 0 to 20 parts by weight of rubber different from B)
- D) from 0 to 70 parts by weight of a copolymer of
  - D.1) from 50 to 98, preferably from 60 to 95, parts by weight of styrene, α-methylstyrene, ring-substituted styrenes, $C_1$–$C_8$ alkyl methacrylates, $C_1$–$C_8$ alkyl acrylates or mixtures thereof and
  - D.2) from 50 to 2, preferably from 40 to 5, parts by weight of acrylonitrile, methacrylonitrile, $C_1$–$C_8$ alkyl methacrylates, $C_1$–$C_8$ alkyl acrylates, maleic anhydride, N-substituted maleimides and mixtures thereof,
- E) from 0 to 80 parts by weight of aromatic polycarbonate,
- F) from 1 to 20, preferably from 1 to 18, in particular from 2 to 15, parts by weight of monomeric or oligomeric phosphate esters or phosphonate esters having molar masses of from 250 to 10,000 g/mol,
- G) from 0.05 to 5, preferably from 0.1 to 1, parts by weight of fluorinated polyolefin, wherein the sum of the components A+B+C+D+E+F+G totals 100.

Component A

The block copolycarbonates according to the invention are prepared by adding the polybutylene α-haloketocarboxylic acids to the polycondensation reaction, that is, to the reaction for the preparation of polycarbonates from diphenols, phosgene, chain terminators and optionally branching agents.

The incorporation of the PIB blocks into the polymer chain during the phase-boundary polycondensation takes place via ester bonds and additionally through the replacement of halogen via ether bonds.

The molecular weight $\overline{M}_w$ (weight average, determined by light scattering) of the block copolycarbonates thus prepared is generally between 8000 and 150,000 or the block copolycarbonates have a relative solution viscosity of 1.15 to 1.5 (determined on a 0.5% solution in methylene chloride at 25° C.).

The polybutylene α-haloketocarboxylic acids can be obtained by known methods, for example, by decomposition of halobutyl rubbers through oxidation. In a particularly preferred method ozone is used for the decomposition through oxidation.

The halobutyl rubbers required for the preparation are commercially available high-molecular, solid polymers, which are obtainable in solution by copolymerisation of isobutylene with 0.3 to 15 mol-% of isoprene and subsequent careful halogenation in the alkyl position using elemental bromine or chlorine. Here the isoprene is bonded substantially in the 1, 4-position. Small proportions of 1,2-bonding, which is present in all commercially available butyl rubbers and which cannot be completely suppressed, lead to small proportions of lateral carboxyl groups in the oxidation products. The halogen content in the halobutyl rubbers is between 0.1 and 15 wt. %, preferably between 0.5 and 5 wt. %. The Mooney viscosity of the halobutyl rubbers is between 30 and 80 (ML 1+8, 125° C.) and the average molecular weight $\overline{M}_n$ (number average, determined by gel permeation chromatography) is between 20,000 and 1,000,000, preferably between 100,000 and 500,000. Suitable halobutyl rubbers are described, for example, in Ullmann's Encyclopedia of Industrial Chemistry, Vol. A23 (1993), page 314 ff. Other 1,3-dienes apart from isoprene are also suitable as comonomers, but these products are not commercially available. Suitable comonomers are mentioned, for example, in H. Güterbock, "Polyisobutylen und Isobutylen-Mischpolymerisate", Springer Verlag, Berlin, 1959.

Through the oxidation of halobutyl rubber solutions using ozone, the halobutyl rubbers are split at the double bonds still present accompanied by a decrease in the molecular weight and formation of carboxyl-ketone groups or aldehyde groups. Depending on the starting polymer used, chlorine or bromine is present in the α-position to the carboxyl or carbonyl groups.

The acid number and the molecular weight of the polybutylene α-haloketocarboxylic acids thus obtainable are dependent on the content of isoprene or diene in the copolymer and on the excess of ozone chosen. The acid number is generally between 2 and 250 mg KOH/g, preferably between 2 and 100 mg KOH/g, particularly preferably between 2 and 50 mg KOH/g. The molecular weight $\overline{M}_n$ (number average, determined by HPGPC) of the products is generally between 500 and 50,000, preferably between 1,000 and 10,000. The halogen content corresponds to that of the halobutyl rubber used.

According to the invention, suitable thermoplastic, aromatic polycarbonates are those based on diphenols of formula (I)

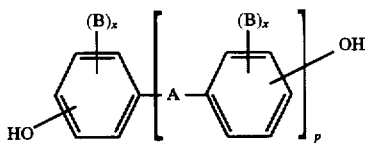

wherein
A represents a single bond, $C_1$–$C_5$ alkylene, $C_2$–$C_5$ alkylidene, $C_5$–$C_6$ cycloalkylidene, —S— or —$SO_2$—,
B represents chlorine, bromine,
x is 0, 1 or 2 and
p is 1 or 0
or alkyl-substituted dihydroxyphenylcycloalkanes of formula (II),

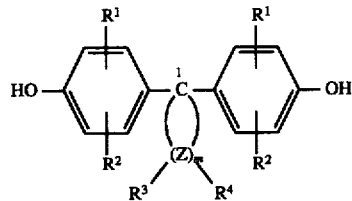

wherein
$R^1$ and $R^2$ independently of one another signify hydrogen, halogen, preferably chlorine or bromine, $C_1$–$C_8$ alkyl, $C_5$–$C_6$ cycloalkyl, $C_6$–$C_{10}$ aryl, preferably phenyl, and $C_7$–$C_{12}$ aralkyl, preferably phenyl-$C_1$–$C_4$ alkyl, in particular benzyl,
m is an integer from 4 to 7, preferably 4 or 5,
$R^3$ and $R^4$ independently of one another signify hydrogen or $C_1$–$C_6$ alkyl, individually selectable for each Z and
Z signifies carbon, on condition that, on at least one atom Z, $R^3$ and $R^4$ are both alkyl.

Examples which may be mentioned are hydroquinone, resorcinol, dihydroxydiphenyl, bis(hydroxyphenyl)alkanes, bis(hydroxyphenyl)cycloalkanes, bis(hydroxyphenyl) sulphides, bis(hydroxyphenyl) ethers, bis(hydroxyphenyl) ketones, bis(hydroxyphenyl) sulphoxides, bis(hydroxyphenyl) sulphones and α,α-bis(hydroxyphenyl) diisopropylbenzenes as well as ring-alkylated and ring-halogenated compounds.

Suitable diphenols are described, for example, in the U.S. Pat. Nos. 3,028,365, 2,999,835, 3,062,781, 3,148,172 and 4,982,014, in the Deutsche Offenlegungs-schriften 1 570 703 and 2 063 050 as well as in the monograph by H. Schnell, "Chemistry and Physics of Polycarbonates", Interscience Publishers, New York, 1964.

Preferred diphenols are
4,4'-dihydroxydiphenyl,
2,2-bis(4-hydroxyphenyl)propane,
2,4-bis(4-hydroxyphenyl)-2-methylbutane,
1,1-bis(4-hydroxyphenyl)cyclohexane,
α,α-bis(4-hydroxyphenyl)-p-diisopropylbenzene,
2,2-bis(3-methyl-4-hydroxyphenyl)propane,
2,2-bis(3-chloro-4-hydroxyphenyl)propane,
bis(3,5-dimethyl-4-hydroxyphenyl)methane,
2,2-bis(3,5-dimethyl-4-hydroxyphenyl)propane,
bis(3,5-dimethyl-4-hydroxyphenyl) sulphone,
2,4-bis(3,5-dimethyl-4-hydroxyphenyl)-2-methylbutane,
1,1-bis(3,5-dimethyl-4-hydroxyphenyl)cyclohexane,
α,α'-bis(3,5-dimethyl-4-hydroxyphenyl)-p-diisopropylbenzene,
1,1-bis(4-hydroxyphenyl)-3,3,5-trimethylcyclohexane,
1,1-bis(4-hydroxyphenyl)-3-methylcyclohexane,
1,1-bis(4-hydroxyphenyl)-3,3-dimethyl cyclohexane,
1,1-bis(4-hydroxyphenyl)-4-methylcyclohexane,
2,2-bis(3,5-dichloro-4-hydroxyphenyl)propane and
2,2-bis(3,5-dibromo-4-hydroxyphenyl)propane.

Particularly preferred diphenols are, for example,
2,2-bis(4-hydroxyphenyl)propane,
2,2-bis(3,5-dimethyl-4-hydroxyphenyl)propane,
2,2-bis(3,5-dichloro-4-hydroxyphenyl)propane,
2,2-bis(3,5-dibromo-4-hydroxyphenyl)propane,
1,1-bis(4-hydroxyphenyl)cyclohexane,
1,1-bis(4-hydroxyphenyl)-3,3,5-trimethylcyclohexane,
1,1-bis(4-hydroxyphenyl)-3-methylcyclohexane,
1,1-bis(3,5-dimethyl-4-hydroxyphenyl)-4-methylcyclohexane.

In particular 2,2-bis(4-hydroxyphenyl)propane and 1,1-bis(4-hydroxyphenyl)-3,3,5-trimethylcyclohexane are preferred.

Any mixtures of the above-mentioned diphenols may also be used.

For the purpose of improving the flow behaviour, small quantities, preferably quantities of between 0.05 and 2.0 mol-% (referred to moles of diphenols used), of trifunctional or more than trifunctional compounds, in particular those having three or more than three phenolic hydroxyl groups, may also be used concomitantly in the known manner. Examples of some usable compounds having three or more than three phenolic hydroxyl groups are 1,3,5-tri(4-hydroxyphenyl)benzene, 1,1,1-tri(4-hydroxyphenyl)ethane, 2,6-bis(2-hydroxy-5'-methylbenzyl)-4-methylphenol, 2-(4-hydroxyphenyl)-2-(2,4-dihydroxyphenyl)propane, hexa(4-(4-hydroxyphenylisopropyl)phenyl) orthoterephthalate, tetra(4-hydroxyphenyl)methane and 1,4-bis-(4',4"-dihydroxytriphenyl)methyl)benzene. Some other trifunctional compounds are 2,4-dihydroxybenzoic acid, trimesic acid, cyanuric chloride and 3,3-bis(4-hydroxy-3-methylphenyl)-2-oxo-2,3-dihydroindole.

The preparation of the block polycarbonates according to the invention can be carried out substantially in the disperse phase by the known solution process (so-called two-phase interface process) (cf. H. Schnell, "Chemistry and Physics of Polycarbonates", Polymer Review, Vol. IX, page 27 ff., Interscience Publ. 1964).

Here the diphenols to be used are dissolved in aqueous alkaline phase. To this the chain terminators required for the preparation of the polycarbonates according to the invention are added in quantities of from 1 to 20 mol-%, referred to moles of diphenol, dissolved in an organic solvent or in solid form. The reaction with phosgene then takes place in the presence of an inert, preferably polycarbonate-dissolving, organic phase. The reaction temperature is between 0° C. and 40° C. The polyisobutylene α-haloketocarboxylic acids are added to the reaction in the required quantity as pure substance or dissolved in the solvent forming the organic phase.

The addition of the required chain terminator in the form and quantity given above can also take place during the phosgenation.

Suitable organic solvents for the chain terminators are, for example, methylene chloride, chlorobenzene, mixtures of methylene chloride and chlorobenzene, acetone, acetonitrile, toluene.

The reaction can be promoted by catalysts such as tributylamine or triethylamine. In order to promote the incorporation of the chain terminator, onium salts such as, for instance, tetraalkylammonium halides, can be used concomitantly as phase-transfer catalysts.

If branching agents are used concomitantly, they can be added prior to the reaction with phosgene or during the phosgenation.

In addition to or instead of the diphenols, the chlorocarboxylic esters thereof may also be used.

The block copolycarbonates according to the invention are isolated in a known manner. Suitable working-up methods are in particular precipitation, spray-drying and evaporation of the solvent in a vacuum.

In addition to the diphenols, up to 50 mol-% of the bischlorocarboxylic esters thereof, referred to the diphenols employed, may also be used.

Component B

Preferred graft backbones are polybutadienes, butadiene-styrene copolymers and acrylic rubbers. The graft backbone is particulate and as a rule has an average particle diameter ($d_{50}$) of from 0.05 to 5 μm, preferably from 0.1 to 0.8 μm.

The graft backbone may contain, in addition to butadiene, up to 50 wt. % of groups of other ethylenically unsaturated monomers, such as styrene, acrylonitrile, esters of acrylic acid or methacrylic acid having 1 to 4 C atoms in the alcohol component (such as methyl acrylate, ethyl acrylate, methyl methacrylate, ethyl methacrylate), vinyl esters and/or vinyl ethers. The preferred graft backbone consists of pure polybutadiene.

Preferred graft polymers B are, for example, substrates B.2 such as polybutadienes, butadiene-styrene copolymers and acrylic rubbers grafted with styrene and/or acrylonitrile and/or (meth)acrylic alkyl esters, that is, copolymers of the kind described in DE-OS 1 694 173 (equivalent to U.S. Pat. No. 3,564,077), polybutadienes, butadiene-styrene or butadiene-acrylonitrile copolymers, polyisobutenes or polyisoprenes, grafted with acrylic ester or methacrylic ester, with vinyl acetate, with acrylonitrile, with styrene and/or alkylstyrenes, which are described, for example, in DE-OS 2 348 377 (equivalent to U.S. Pat. No. 3,919,353).

Since, as is generally known, the graft monomers are not necessarily completely grafted onto the graft backbone, according to the invention by graft polymers C are also meant those products which are obtained by polymerisation of the graft monomers in the presence of the graft backbone.

The average particle size $d_{50}$ is the diameter above and below which 50 wt. % respectively of the particles lie. It can be determined by means of ultracentrifugation measurements (W. Scholtan, H. Lange, Kolloid. Z. and Z. Polymere 250, (1972), 782–796).

The acrylic rubbers (graft backbone B.2) are preferably polymers consisting of acrylic alkyl esters, optionally containing up to 40 wt. % of other polymerisable, ethylenically unsaturated monomers. The preferred polymerisable acrylic esters include $C_1$–$C_8$ alkyl esters, for example, methyl, ethyl, butyl, n-octyl and 2-ethylhexyl esters; haloalkyl esters, preferably halo-$C_1$–$C_8$ alkyl esters, such as chloroethyl acrylate, as well as mixtures of these monomers.

Monomers having more than one polymerisable double bond can be copolymerised to effect cross-linking. Preferred examples of cross-linking monomers are esters of unsaturated monocarboxylic acids having 3 to 8 C atoms and unsaturated polyhydric alcohols having 3 to 12 C atoms or saturated polyols having 2 to 4 OH groups and 2 to 20 C atoms such as, for example, ethylene glycol dimethacrylate, allyl methacrylate, polyunsaturated heterocyclic compounds such as, for example, trivinyl cyanurate and triallyl cyanurate, polyfunctional vinyl compounds such as divinylbenzene and trivinylbenzene, and also triallyl phosphate and diallyl phthalate.

The quantity of cross-linked monomers is preferably from 0.02 to 5 wt. %, in particular from 0.05 to 2 wt. %, referred to the graft backbone.

Component C

The rubbers used optionally as component C are preferably ethylene-vinyl acetate copolymers, polyisobutylene rubbers, epoxyfunctional ethylene-acrylic terpolymers, particularly preferably polyisobutylene rubbers.

The ethylene-vinyl acetate copolymers have a vinyl acetate content of from 20 to 80 wt. %. The epoxyfunctional ethylene-acrylic copolymers have an ethylene content of from 60 to 90 wt. %, an acrylic content of from 8 to 38 wt. % and a proportion of epoxyfunctional monomers, preferably polyacryl methacrylate, of from 2 to 15 wt. %. The polyisobutylene rubbers consist to the extent of 85 to 100 wt. % of cationically polymerised isobutene, whereto from 0 to 15 wt. % of comonomers such as, for example, dienes, m/p-methylstyrene, styrene, α-methylstyrene or divinylbenzene can be added. The molecular weight (weight average) $\overline{M}_w$ is 200.000 to 2.000.000.

If the mixture contains copolymers used as component C, preferably from 5 to 20 wt. % (referred to 100 parts A+D+C+D+E+F) is added.

Component D

The thermoplastic polymer D consists of homopolymers or copolymers of one or more ethylenically unsaturated monomers (vinyl monomers) such as, for example, styrene, α-methylstyrene, ring-substituted styrenes, acrylonitrile, methacrylonitrile, methyl methacrylate, maleic anhydride, N-substituted maleimide and (meth)acrylic esters having 1 to 18 C atoms in the alcohol component.

The copolymers used in component D are resinous, thermoplastic and free from rubber.

Preferred vinyl copolymers D are those consisting of at least one monomer from the series styrene, α-methylstyrene and/or ring-substituted styrene (D.1) together with at least one monomer from the series acrylonitrile, methacrylonitrile, methyl methacrylate, maleic anhydride and/or N-substituted maleimide (D.2).

Particularly preferred copolymers D are those consisting of styrene with acrylonitrile and optionally with methyl methacrylate, of α-methylstyrene with acrylonitrile and optionally with methyl methacrylate or of styrene and α-methylstyrene with acrylonitrile and optionally with methyl methacrylate.

The styrene-acrylonitrile copolymers used as component D are known and can be prepared by radical polymerisation, in particular by emulsion, suspension, solution or bulk polymerisation. The copolymers used as component D possess molecular weights $\overline{M}_w$ (weight average, determined by light scattering or sedimentation) preferably of between 15,000 and 200,000.

Component E

The aromatic polycarbonates which may be added to the mixture correspond to the polycarbonates described under component A). Preferably from 20 to 60 parts by weight of polycarbonate are added.

Component F

The mixtures of polymers according to the invention preferably contain monomeric or ologomeric phosphates of formula (III) as a flameproofing agents.

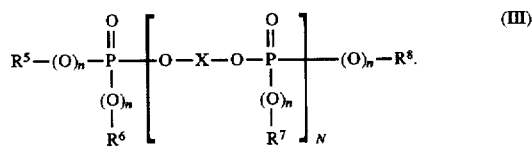

In the formula $R^5$, $R^6$, $R^7$, $R^8$ independently of one another signify $C_1$–$C_8$ alkyl, $C_5$–$C_6$ cycloalkyl, $C_6$–$C_{10}$ aryl or $C_7$–$C_{12}$ aralkyl; $C_6$–$C_{10}$ aryl or $C_7$–$C_{12}$ aralkyl are preferred. The aromatic groups $R^5$, $R^6$, $R^7$ and $R^8$ may for their part be substituted by halogen or alkyl groups. Particularly preferred aryl groups are cresyl, phenyl, xylenyl, methylphenyl, propylphenyl, butylphenyl or isooctylphenyl as well as the brominated and chlorinated derivatives thereof.

X in formula (III) signifies a mononuclear or polynuclear aromatic group having 6 to 30 C atoms. This is derived from diphenols such as, for example, bisphenol A, resorcinol or hydroquinone or even the chlorinated or brominated derivatives thereof.

n in formula (III) can be 0 or 1, independently of one another; preferably n equals 1.

N can assume values of between 0 and 12, preferably 0 and values of between 1 and 3. Mixtures of different oligomeric phosphates can also be used as component F) according to the invention. In this case N has an average value of between 0 and 12, preferably 0.5 and 2.5.

Component G

The fluorinated polyolefins (G) are high-molecular and possess glass transition temperatures of above –30° C., as a rule of above 100° C., fluorine contents preferably of from 65 to 76 wt. %, in particular of from 70 to 76 wt. %, and average particle diameters $d_{50}$ of from 0.05 to 1.000 µm, preferably of from 0.08 to 20 µm. In general the fluorinated polyolefins have a density of from 1.2 to 2.3 g/cm$^3$. Preferred fluorinated polyolefins are polytetrafluoroethylene, polyvinylidene fluoride, tetrafluoroethylene-hexafluoropropylene and ethylene-tetrafluoroethylene copolymers. The fluorinated polyolefins are known (cf. "Vinyl and Related Polymers" by Schildknecht, John Wiley & Sons Inc., New York, 1962, pages 484 to 494; "Fluoropolymers" by Wall, Wiley-Interscience, John Wiley & Sons Inc., New York, Volume 13, 1970, pages 623 to 654, "Modern Plastics Encyclopedia", 1970 to 1971, Volume 47, No. 10 A, October 1970, McGraw-Hill Inc., New York, pages 134 and 774, "Modern Plastics Encyclopedia", 1975 to 1976, October 1975, Volume 52, No. 10 A, McGraw-Hill Inc., New York, pages 27, 28 and 472 and U.S. Pat. Nos. 3,671,487 and 3,723,373 and 3,838,092).

They can be prepared by known methods, thus for example by polymerisation of tetrafluoroethylene in aqueous medium using a catalyst which promotes the formation of free radicals, for example, sodium peroxydisulphate, potassium peroxydisulphate or ammonium peroxydisulphate, at pressures of from 7 to 71 kg/cm$^3$ and at temperatures of from 0° to 200° C., preferably at temperatures of from 20° to 100° C. (for further details, see, for example, U.S. Pat. No. 2,393,967). Depending on the form of use, the density of these materials may be between 1.2 and 2.3 g/cm$^3$ and the average particle size between 0.05 and 1000 µm.

Preferred fluorinated polyolefins are tetrafluoroethylene polymers and have average particle diameters of from 0.05 to 20 µm, preferably of from 0.08 to 10 µm and a density of from 1.2 to 1.9 g/cm$^2$ and are preferably used in the form of a coagulated mixture of emulsions of the tetrafluoroethylene polymers with emulsions of the graft polymer B).

Suitable fluorinated polyolefins, which can be used in powder form, are tetrafluoroethylene polymers having average particle diameters of from 100 to 1,000 µm and densities of from 2.0 g/cm$^3$ to 2.3 g/cm$^3$.

In order to prepare a coagulated mixture of B) and G), first of all an aqueous emulsion (latex) of a graft polymer B) having latex particle diameters of from 0.05 to 2 µm, in particular of from 0.1 to 0.6 µm, is mixed with a fine emulsion of a tetrafluoroethylene polymer G) in water having an average particle diameter of from 0.05 to 20 µm, in particular of from 0.08 to 10 µm; suitable tetrafluoroethylene emulsions generally have solids contents of from 30 to 70 wt. %, in particular of from 50 to 60 wt. %. The emulsions of graft polymers have solids contents of from 25 to 50 wt. %, preferably of from 30 to 45 wt. %.

The quantity stated in the description of component B) includes the proportion of the graft polymer used for the coagulated mixture of graft polymer and fluorinated polyolefins.

In the mixture of emulsions the weight ratio of graft polymer B) to the fluorinated polyolefin G) is from 95:5 to 60:40. The mixture of emulsions is subsequently coagulated in a known manner, for example, by spray-drying, freeze-drying or coagulation by means of adding inorganic or organic salts, acids, bases or organic solvents miscible in water, such as alcohols, ketones, preferably at temperatures of from 20° to 150° C., in particular from 50° to 100° C. If required, drying can be carried out at 50° to 200° C., preferably 70° to 100° C.

Suitable tetrafluoroethylene polymer emulsions are commercially available products and are supplied, for example, as Teflon® 30 N by the firm DuPont.

The mixtures of the components according to the invention may in addition contain the conventional additives, usual for polycarbonates or butyl rubbers or ABS polymers such as, for example, stabilisers, mould release agents, antioxidants, other flameproofing agents, pigments, dyes et cetera. These additives can be introduced in the usual quantities during the moulding of the mixtures to form the desired mouldings.

The mixing of the components and optionally of the additives is carried out by mixing in the melt in kneaders or extruders at elevated temperature, generally at temperatures of from 230° to 330° C.

The present invention accordingly also provides a process for the production of thermoplastic moulding compositions, wherein the components as well as optionally stabilisers, dyes, pigments, flow control agents, fillers and reinforcing materials, lubricants and mould release agents, nucleating agents and/or antistatic agents on completion of mixing are melt compounded or melt extruded in conventional equipment at temperatures of from 230° to 330° C.

The individual components can be mixed in a known manner in succession as well as simultaneously, and at about 20° C. (room temperature) as well as at more elevated temperatures.

The moulding compositions can be used for the production of mouldings of any kind, for example, by injection moulding. Examples of mouldings are housings of domestic appliances and of electrical appliances.

The invention therefore also provides the use of the moulding compositions for the production of mouldings.

The individual components of the mixture may consist wholly or partly of recyclates or production waste.

EXAMPLES

Component A) PC/PIB block cocondensate:

A1) Preparation of a chlorine-containing polyisobutylene α-haloketocarboxylic acid 10 kg of chlorobutyl rubber having a chlorine content of 1.2 wt. % and a Mooney viscosity of 46 (MN 1+8, 125° C.) (Polysar Chlorobutyl 1255, commercial product from Bayer AG) is comminuted into coarse lumps (about 2 cm in diameter) and suspended in 40 l of hexane. A stream of oxygen enriched with ozone (1,000 l/h, quantity of ozone approx. 15 g/h) is introduced into the mixture, with stirring, at 15° to 25° C., until an acid number of 11 is attained. The introduction time required for this is 40 hours. In the course of the introduction the solid components dissolve completely. After the mixture has been flushed with nitrogen, the solvent is distilled off. The average molecular weight $(\overline{M}_n)$ is 4,400, the chlorine content is 1.2 wt. % and the acid number is 13.

A2) Preparation of a PC/PIB block cocondensate 8,000 g of 45% NaOH, 40 l of water, 4560 g of bisphenol A, 45 g of tert. butylphenol, 564 g of chlorine-containing PIB telechele as in Example A1), 13.2 kg of chlorobenzene and 37.2 kg of methylene chloride are placed in a receiver. 3,000 g of phosgene is introduced and the mixture is condensed with the addition of 28 ml of N-ethylpiperidine. The isolation is carried out conventionally by acidification, separation of the organic phase and evaporation in the stripping column.

The block copolycarbonate contains 10 wt. % of the PIB component.

The relative solution viscosity (0.5% in methylene chloride at 25° C.) is 1.29.

B) ABS graft polymer

Graft copolymer of 40 parts by weight of styrene and acrylonitrile in the ratio 73:27 on 60 parts by weight of particulate cross-linked polybutadiene rubber (average particle diameter $d_{50}$=0.28 μm), produced by emulsion polymerisation (similarly to Example B.I of DE-OS 3 738 143).

D) SAN

Styrene-acrylonitrile copolymer having a ratio of styrene to acrylonitrile of 72:28 and an intrinsic viscosity of 0.55 dl/g (measured in dimethylformamide at 20° C.).

E) PC (polycarbonate) based on bisphenol A

The values for the relative solution viscosity $(\eta_{rel})$ given in the Examples are measured on a 0.5% solution in methylene chloride at 25° C.

F) Phosphate

Triphenyl phosphate and m-phenylene-bis(diphenyl phosphate) in the weight ratio 1:3.

G) Teflon/Graft polymer

Tetrafluoroethylene polymer is a coagulated mixture of a SAN graft polymer emulsion, consisting of a graft polymer of 45 wt. % of styrene and acrylonitrile in the weight ratio of 72:28 to 55 wt. % of particulate cross-linked polybutadiene rubber (average particle diameter $d_{50}$=0.4 μm) prepared by emulsion polymerisation (similarly to Example B.II of DE-OS 3 378 143) in water, and of a tetrafluoroethylene polymer emulsion in water. The weight ratio of graft polymer to tetrafluoroethylene polymer emulsion in the mixture is 90:10. The tetrafluoroethylene polymer emulsion has a solids content of 60 wt. % and the average particle diameter is between 0.05 and 0.5 μm. The SAN graft polymer emulsion has a solids content of 34 wt. % and an average latex particle diameter of 0.5 μm. The emulsion of the tetrafluoroethylene polymer (Teflon 30N from the firm DuPont) is mixed with the emulsion of the SAN graft polymer and stabilised using 1.8 wt. %, referred to solid polymer, of phenolic antioxidants. At 85° to 95° C. the mixture is coagulated using an aqueous solution of $MgSO_4$ (Epsom salt) and acetic acid at pH 4 to 5, filtered and washed until virtually free of electrolyte, then freed from the bulk of the water by centrifugation and subsequently dried to a powder at 100° C.

Stabiliser: cyclic phosphite

Cyclic phosphate ester of 2,2'-methylene-bis(6-cyclohexyl-4-methylphenol)

The moulding compositions are prepared at 240° C. by mixing the components on a twin-shaft extruder (ZSK 32 from the firm Werner and Pfleiderer) and are then processed in an injection moulding machine at 260° C. to form mouldings.

| Examples (Data in parts by weight) | A$^{Comparison}$ | 1 | 2 |
|---|---|---|---|
| Block copolycarbonate A) | — | 49 | 49 |
| PC ($\eta_{rel}$ = 1.28) | 49 | — | — |
| PC ($\eta_{rel}$ = 1.20) | 30 | 30 | 30 |
| SAN | 5 | 5 | 5 |
| ABS graft | 5 | 5 | 5 |
| Teflon/graft | 3.5 | 3.5 | 4 |
| Phosphate | 8 | 8 | 9,2 |
| Cyclic phosphate | 0.1 | 0.1 | 0.1 |
| Pentaerythritol tetrastearate | 0.5 | 0.5 | 0.5 |
| Filling pressure (260° C. in bar) | 133 | 128 | 127 |
| UL 94 V | V1 | V1 | V0 |
| ESC 0.4% 5 min | EC + OC | no result | no result |
| ESC 1.0% 5 min | EC + OC | no result | no result |
| ESC 1.6% 5 min | EC + OC | no result | no result |
| ESC 2.0% 5 min | Fracture | no result | no result |
| ESC 2.4% 5 min | fractured | EC + OC | no result |
| ESC 2.4% 5 min | fractured | BC+OC | no result |
| ak Izod RT (kJ/m$^2$) ISO 180 | 42 | 55 | 58 |
| ak Izod −10° C. (kJ/m$^2$) ISO 180 | 16 | 41 | 46 |

The medium used for the measurement of the environmental stress cracking (ESC) behaviour was a mixture of isopropanol/toluene 40:60. EC-OC means edge cracking and top cracking.

The mixtures in Examples 1 and 2 exhibit a distinctly improved stress cracking resistance and notch impact strength. Moreover the flow behaviour is improved, as the lower filling pressure indicates, although the block copolycarbonate used has a higher relative solution viscosity than that of the polycarbonate used in Comparative Example A.

We claim:

1. Thermoplastic moulding compositions containing

A) from 5 to 90 parts by weight of block copolycarbonates of polycarbonate blocks and from 0.5 to 30 wt. %, based on the weight of the block copolycarbonate, of polyisobutylene alpha-haloketocarboxylic acid blocks, wherein the polyisobutylene alpha-haloketocarboxylic acid blocks have average molecular weights $\overline{M}_n$ (number average) of between 500 and 50,000, halogen contents prior to incorporation of between 0.1 and 15 wt. % based on the weight of the PIB blocks, and acid numbers of between 2 and 250 mg KOH/g, and further wherein said halogen is chlorine or bromine, B) from 5 to 95 parts by weight of graft polymer of a mixture of B.1.1 from 50 to 95 parts by weight of styrene, α-methylstyrene, styrene ring-substituted by halogen or methyl, $C_1$–$C_8$ alkyl acrylate or mixtures of these compounds and B.1.2 from 5 to 50 parts by weight of acrylonitrile, methacrylonitrile, $C_1$–$C_8$ alkyl methacrylates, maleic anhydride, $C_1$–$C_4$ alkyl- or phenyl-N-substituted maleimide or mixtures of these compounds on B.2 from 5 to 95 parts by weight of polymer based on diene and/or alkyl acrylate, having a glass transition temperature of below −10° C., C) from 0 to 20 parts by weight of rubber different from B), D) from 0 to 70 parts by weight of a copolymer of D.1) from 50 to 98 parts by weight of styrene, α-methylstyrene, ring-substituted styrenes, $C_1$–$C_8$ alkyl methacrylates, $C_1$–$C_8$ alkyl acrylates or mixtures thereof and D.2) from 50 to 2 parts by weight of acrylonitrile, methacrylonitrile, maleic anhydride, N-substituted maleimides and mixtures thereof, E) from 0 to 80 parts by weight of aromatic polycarbonate, F) from 1 to 20 parts by weight of monomeric or oligomeric phosphate esters or phosphonate esters having molar masses of from 250 to 10,000 g/mol, G) from 0.05 to 5 parts by weight of fluorinated polyolefin, wherein the sum of the components A+B+C+D+E+F+G totals 100.

2. Moulding compositions according to claim 1, wherein component F) comprises phosphorus compounds of formula (III)

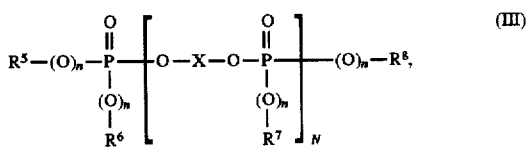

wherein $R^5$, $R^6$, $R^7$, $R^8$ independently of one another signify $C_1$–$C_8$ alkyl, $C_5$–$C_6$ cycloalkyl, $C_6$–$C_{10}$ aryl or $C_7$–$C_{12}$ aralkyl, wherein the aromatic groups in $R^5$, $R^6$, $R^7$ and $R^8$ may for their part be substituted by halide groups or alkyl groups, X signifies a mononuclear or polynuclear aromatic group having 6 to 30 C atoms, n independently of one another is 0 or 1, N represents values of between 0 and 12.

3. Moulding compositions according to claim 2, wherein $R^5$, $R^6$, $R^7$, $R^8$ independently of one another represent cresyl, phenyl, xylenyl, methylphenyl, propylphenyl, butylphenyl or isooctylphenyl as well as chlorinated and brominated derivatives thereof, and X is derived from bisphenol A, resorcinol or hydroquinone.

4. Moulding compositions according to claim 1, wherein component G) is used in the form of a coagulated mixture with component B).

5. Moulding compositions according to claim 1, wherein said moulding compositions contain an additive selected from the group consisting of stabilisers, dyes, pigments, flow control agents, fillers, reinforcing materials, lubricants, mould release agents, nucleating agents and antistatic agents.

6. A method of using the moulding compositions according to claim 1, comprising the step of placing one of said moulding compositions in a mould to form a moulded body and extracting said moulded body from said mould.

7. Mouldings produced from moulding compositions according to claim 1.

8. Moulding compositions according to claim 1, wherein component B.1.1 is methyl acrylate.

9. Moulding compositions according to claim 1, wherein component G is present in an amount of from 0.1 to 1 parts by weight.

10. Thermoplastic moulding compositions containing

A) from 5 to 90 parts by weight of block copolycarbonates of polycarbonate blocks and from 0.5 to 30 wt. %, based on the weight of the block copolycarbonate, of polyisobutylene alpha-haloketocarboxylic acid blocks, wherein the polyisobutylene alpha-haloketocarboxylic acid blocks have average molecular weights $\overline{M}_n$ (number average) of between 500 and 50,000, halogen contents prior to incorporation of between 0.1 and 15 wt. % based on the weight of the PIB blocks, and acid numbers of between 2 and 250 mg KOH/g, and further wherein said halogen is chlorine or bromine, B) from 5 to 95 parts by weight of graft polymer of a mixture of B.1.1 from 50 to 95 parts by weight of styrene, α-methylstyrene, styrene ring-substituted by halogen or methyl, or mixtures of these compounds and B.1.2 from 5 to 50 parts by weight of acrylonitrile, methacrylonitrile, $C_1$–$C_8$ alkyl methacrylates, $C_1$–$C_8$ alkyl acrylate, maleic anhydride, $C_1$–$C_4$ alkyl- or phenyl-N-substituted maleimide or mixtures of these compounds on B.2 from 5 to 95 parts by weight of polymer based on diene and/or alkyl acrylate, having a glass transition temperature of below −10° C., C) from 0 to 20 parts by weight of rubber different from B), D) from 0 to 70 parts by weight of a copolymer of D.1) from 50 to 98 parts by weight of styrene, α-methylstyrene, ring-substituted styrenes, $C_1$–$C_8$ alkyl methacrylates, $C_1$–$C_8$ alkyl acrylates or mixtures thereof and D.2) from 50 to 2 parts by weight of acrylonitrile, methacrylonitrile, maleic anhydride, N-substituted maleimides and mixtures thereof, E) from 0 to 80 parts by weight of aromatic polycarbonate, F) from 1 to 20 parts by weight of monomeric or oligomeric phosphate esters or phosphonate esters having molar masses of from 250 to 10,000 g/mol, G) from 0.05 to 5 parts by weight of fluorinated polyolefin, wherein the sum of the components A+B+C+D+E+F+G totals 100.

11. Thermoplastic moulding compositions containing

A) from 5 to 90 parts by weight of block copolycarbonates of polycarbonate blocks and from 0.5 to 30 wt. %, based on the weight of the block copolycarbonate, of polyisobutylene alpha-haloketocarboxylic acid blocks, wherein the polyisobutylene alpha-haloketocarboxylic acid blocks have average molecular weights $\overline{M}_n$ (number average) of between 500 and 50,000, halogen contents prior to incorporation of between 0.1 and 15 wt. % based on the weight of the PIB blocks, and acid numbers of between 2 and 250 mg KOH/g, and further wherein said halogen is chlorine or bromine, B) from 5 to 95 parts by weight of graft polymer of a mixture of B.1.1 from 50 to 95 parts by weight of styrene, α-methylstyrene, styrene ring-substituted by halogen or methyl, $C_1$–$C_8$ alkyl acrylate or mixtures of these compounds and B.1.2 from 5 to 50 parts by weight of acrylonitrile, methacrylonitrile, $C_1$–$C_8$ alkyl methacrylates, maleic anhydride, $C_1$–$C_4$ alkyl- or phenyl-N-substituted maleimide or mixtures of these compounds on B.2 from 5 to 95 parts by weight of polymer based on diene and/or alkyl acrylate, having a glass transition temperature of below −10° C., C) from 0 to 20 parts by weight of rubber different from B), D) from 0 to 70 parts by weight of a copolymer of D.1) from 50 to 98 parts by weight of styrene, α-methylstyrene, ring-substituted styrenes, or mixtures thereof and D.2) from 50 to 2 parts by weight of acrylonitrile, methacrylonitrile, $C_1$–$C_8$ alkyl methacrylates, $C_1$–$C_8$ alkyl acrylates, maleic anhydride, N-substituted maleimides and mixtures thereof, E) from 0 to 80 parts by weight of aromatic polycarbonate, F) from 1 to 20 parts by weight of monomeric or oligomeric phosphate esters or phosphonate esters having molar masses of from 250 to 10,000 g/mol, G) from 0.05 to 5 parts by weight of fluorinated polyolefin, wherein the sum of the components A+B+C+D+E+F+G totals 100.

12. Thermoplastic moulding compositions containing

A) from 5 to 90 parts by weight of block copolycarbonates of polycarbonate blocks and from 0.5 to 30 wt. %, based on the weight of the block copolycarbonate, of polyisobutylene alpha-haloketocarboxylic acid blocks, wherein the polyisobutylene alpha-haloketocarboxylic acid blocks have average molecular weights $\overline{M}_n$ (number average) of between 500 and 50,000, halogen contents prior to incorporation of between 0.1 and 15 wt. % based on the weight of the PIB blocks, and acid numbers of between 2 and 250 mg KOH/g, and further wherein said halogen is chlorine or bromine, B) from 5 to 95 parts by weight of graft polymer of a mixture of B.1.1 from 50 to 95 parts by weight of styrene, α-methylstyrene, styrene ring-substituted by halogen or methyl, or mixtures of these compounds and B.1.2 from 5 to 50 parts by weight of acrylonitrile, methacrylonitrile, $C_1$–$C_8$ alkyl methacrylates, $C_1$–$C_8$ alkyl acrylate, maleic anhydride, $C_1$–$C_4$ alkyl- or phenyl-N-substituted maleimide or mixtures of these compounds on B.2 from 5 to 95 parts by weight of polymer based on diene and/or alkyl acrylate, having a glass transition temperature of below −10° C., C) from 0 to 20 parts by weight of rubber different from B), D) from 0 to 70 parts by weight of a copolymer of D.1) from 50 to 98 parts by weight of styrene, α-methylstyrene, ring-substituted styrenes, or mixtures thereof and D.2) from 50 to 2 parts by weight of acrylonitrile, methacrylonitrile, $C_1$–$C_8$ alkyl methacrylates, $C_1$–$C_8$ alkyl acrylates, maleic anhydride, N-substituted maleimides and mixtures thereof, E) from 0 to 80 parts by weight of aromatic polycarbonate, F) from 1 to 20 parts by weight of monomeric or oligomeric phosphate esters or phosphonate esters having molar masses of from 250 to 10,000 g/mol, G) from 0.05 to 5 parts by weight of fluorinated polyolefin, wherein the sum of the components A+B+C+D+E+F+G totals 100.

* * * * *

UNITED STATES PATENT AND TRADEMARK OFFICE
CERTIFICATE OF CORRECTION

PATENT NO. : 5,750,602
DATED : MAY 12, 1998
INVENTOR(S) : KÖHLER ET AL.

It is certified that error appears in the above-identified patent and that said Letters Patent is hereby corrected as shown below:

Column 14, line 48, a claim 13 should be added as follows:

--13. Moulding compositions according to claim 1, wherein said moulding compositions contain additives selected from the group consisting of stabilisers, dyes, pigments, flow control agents, fillers, reinforcing materials, lubricants, mould release agents, nucleating agents and antistatic agents.--

Signed and Sealed this

Eighth Day of December, 1998

Attest:

BRUCE LEHMAN

Attesting Officer

Commissioner of Patents and Trademarks